United States Patent [19]

Tuck et al.

[11] Patent Number: 5,563,808
[45] Date of Patent: Oct. 8, 1996

[54] PILGER MILL MANDREL MEASURING DEVICE

[75] Inventors: Paul B. Tuck; Gregory C. Gilmore, both of Wilmington, N.C.

[73] Assignee: General Electric Company, San Jose, Calif.

[21] Appl. No.: 55,475

[22] Filed: May 3, 1993

[51] Int. Cl.$^6$ .......................... G01B 11/08; G01B 11/24
[52] U.S. Cl. ............... 364/560; 364/474.08; 364/474.37; 356/376; 356/384; 382/141
[58] Field of Search ...................... 364/560, 559, 364/474.05, 474.08, 474.28, 474.35, 474.37; 382/8; 318/570; 356/376, 384

[56] References Cited

U.S. PATENT DOCUMENTS

| | | | |
|---|---|---|---|
| 3,852,579 | 12/1974 | Sohn et al. | 364/559 X |
| 4,451,892 | 5/1984 | McMurtry | 364/474.35 X |
| 4,555,799 | 11/1985 | Kodama et al. | 382/8 |
| 4,576,482 | 3/1986 | Pryor | 356/384 |
| 4,658,633 | 4/1987 | Freer | 73/37.5 |
| 4,769,763 | 9/1988 | Trieb et al. | 364/559 |
| 4,807,152 | 2/1989 | Lane et al. | 364/560 X |
| 4,823,396 | 4/1989 | Thompson | 382/8 |
| 4,887,155 | 12/1989 | Massen | 364/560 X |
| 4,931,945 | 6/1990 | Taguchi et al. | 382/8 X |
| 4,964,071 | 10/1990 | Grosvenor | 364/560 |
| 4,969,110 | 11/1990 | Little et al. | 364/560 X |
| 5,060,173 | 10/1991 | Tsuji | 364/560 X |
| 5,140,534 | 8/1992 | Miller et al. | 364/560 |
| 5,160,978 | 11/1992 | Faville | 364/559 X |
| 5,247,463 | 9/1993 | Mancosu et al. | 364/560 |

*Primary Examiner*—Emanuel T. Voeltz
*Assistant Examiner*—Eric W. Stamber
*Attorney, Agent, or Firm*—J. E. McGinness

[57] ABSTRACT

A method and an apparatus for measuring a tapered cylindrical object, such as a mandrel. The apparatus employs a linear positioning table assembly with a slide mounting for a laser micrometer, an axial position stepper motor for moving the laser micrometer stepwise along the axial length of the mandrel, and an angular position stepper motor for stepwise rotation of the object. The laser micrometer measures a cross-sectional diameter of the mandrel at a plurality of angular positions of the mandrel for each one of a plurality of axial positions along the length of the mandrel. The measurements taken at a plurality of angular positions constitute a circumference profile at that axial position. The circumference profiles at a plurality of axial positions constitute the contour profile of the mandrel. The acquired data are compared to desired mandrel contour profile data.

20 Claims, 6 Drawing Sheets

PILGER MILL MANDREL MEASURING DEVICE

FIELD OF THE INVENTION

This invention generally relates to electro-optical methods for detecting and measuring the shape or contour of objects. In particular, the invention relates to a system for precisely measuring the contour of tapered cylindrical objects, such as a mandrel used in a pilger mill for cold rolling of tubing.

BACKGROUND OF THE INVENTION

Pilger mills are used for cold rolling of seamless pipes or tubing to desired dimensions and tolerances. The pilgering process is advantageously used, for example, to produce Zircaloy tubing for nuclear fuel bundle assemblies. The pilgering process consists of stepwise feeding and turning a tube between a set of tapered die rolls reciprocating over a tapered mandrel. This results in a smooth reduction of the tubing to the desired tube diameter and wall thickness.

Figure 1:
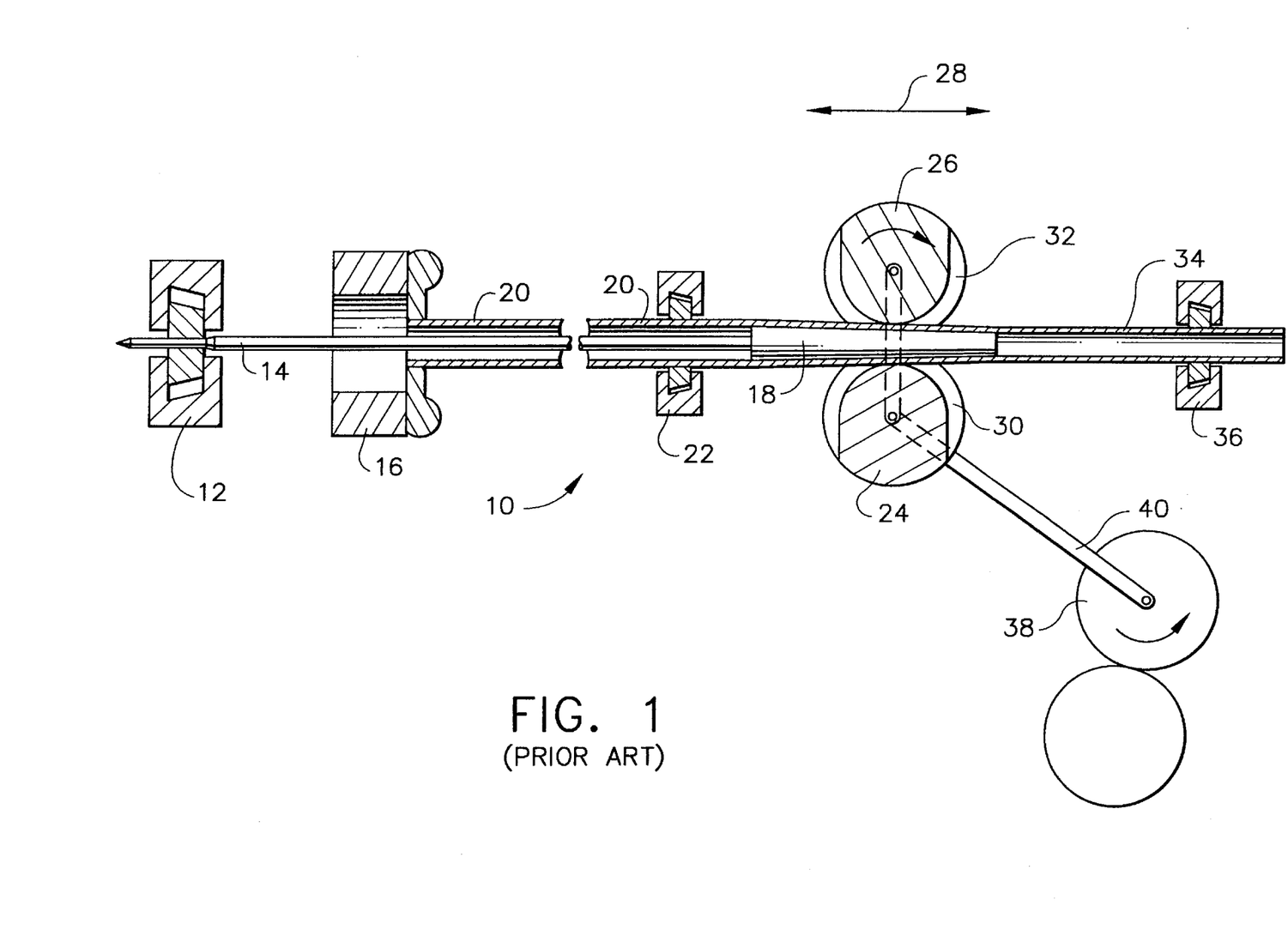
FIG. 1 is a schematic diagram of a conventional pilger mill in which tubing is cold worked between a reciprocating pair of rolls and an inner mandrel.

For purposes of illustration, a pilger mill 10 is shown in FIG. 1 employing a thrust block 12 for supporting a rod 14 which extends through a feed carriage 16 to hold a mandrel die 18. In operation, an ingoing tubing 20 is pushed by the feed carriage 16 through an entry chuck 22 and between a pair of spaced rolls 24 and 26. The rolls 24 and 26 rotate as they undergo a reciprocating lateral movement as indicated by the arrow 28. The rolls have respective grooves 30 and 32 formed therein, each of which has a semicircular cross section with a groove diameter that tapers smoothly in size along the arc length on the roll circumference from the ingoing tubing diameter to the desired diameter of the finished tubing 34. As the ingoing tubing 20 advances through the reciprocating rolls, the tubing is worked to the desired diameter and degree of tolerance.

Reciprocating rotary movement is imparted to the rolls 24 and 26 by pinions mounted on the roll axle engaged with racks fixed to the machine frame (not shown). A crank drive 38 and push rod 40 are used to drive the rolls mounted on a saddle (not shown) along the racks. The two grooved rolls embrace the tubing from above and below as they roll over a predetermined length of the tubing, called the pass length. At the completion of each stroke, the entry chuck 22 and exit chuck 36 grip the tubing and rotate it a predetermined angular amount such that the entire circumference of the tubing can be worked in stepwise fashion.

The ingoing tube 20 is elongated to form the finished tubing 34 through cold rolling reduction of the tubing diameter and wall thickness between the rolls 24 and 26 and the mandrel 18. The mandrel tapers in the direction of rolling from the size of the inside diameter of the ingoing tubing 20 to the size of the inside diameter of the finished tubing 34. The condition and dimensions of the mandrel affect the amount of inner diameter reduction and the output tube quality. Key mandrel traits which result in poor quality output tubing include reverse taper, ovality, size problems, surface condition and defects.

Prior methods for addressing this problem include the use of a hand micrometer to measure the outer diameter of the mandrel at a particular location determined by eye. However, such manual measurement does not provide enough information to accurately determine if the mandrel has acceptable traits for continued use.

SUMMARY OF THE INVENTION

The present invention seeks to provide the ability to precisely measure pilger mill mandrels, and thereby increase the quality and consistency of tubing produced through the pilgering process. The invention is a method and an apparatus for measuring a tapered cylindrical object, such as a mandrel used in the pilgering process. The apparatus comprises means for rotatably supporting a mandrel in a generally horizontal position on a linear positioning table assembly having a slide mounting for a laser micrometer, an axial position stepper motor for moving the laser micrometer stepwise along the axial length of the mandrel, and an angular position stepper motor for stepwise rotation of the mandrel.

At each axial position of the laser micrometer, the mandrel is rotated in a stepwise manner. At each angular position of the mandrel, the laser micrometer measures the mandrel outer diameter, making multiple scans (e.g., 512 scans). For each angular position at an axial point along the mandrel, the average outer diameter is determined for the multiple scans. Taking the average avoids deviations in the measurement results due to noise.

The result is a series of outer diameter measurements at predetermined angular increments over the circumference of the mandrel which effectively represent the cross-sectional contour of the mandrel at that axial position. The contour measurements are then repeated for a series of axial positions over the length of the mandrel, thereby effectively representing the contour of the tapered cylindrical surface.

Thus, the step sequences of an angular position stepper motor and an axial position stepper motor are controlled by computer so that the laser micrometer measurements are taken at precise angular and axial intervals. A selected number of angular intervals are circumferentially distributed at equal angular intervals about the circumference of a plurality of cross sections. Each of the plurality of cross sections is taken at each respective axial positions arranged at intervals along the length of the mandrel to be measured.

Average outer diameter measurements are computed by averaging the measurements taken at each position. The mandrel is then assessed by computer program functions for comparing selected traits of the measured mandrel for deviation within given error levels, such as for incremental change in outer diameter, ovality, and fitting to a reference mandrel profile. If the measured traits are found to be within specified ranges of tolerances, the mandrel can be designated as acceptable for use.

BRIEF DESCRIPTION OF THE DRAWINGS

The preferred embodiment of the invention will be described in detail with reference to the drawings, wherein.

DETAILED DESCRIPTION OF THE PREFERRED EMBODIMENT

A preferred embodiment of the invention will be described in terms of the specific application of measuring the mandrel for a pilger mill. It is understood, however, that the principles of the invention are applicable to related applications for precisely measuring any tapered cylindrical object.

Figure 2:
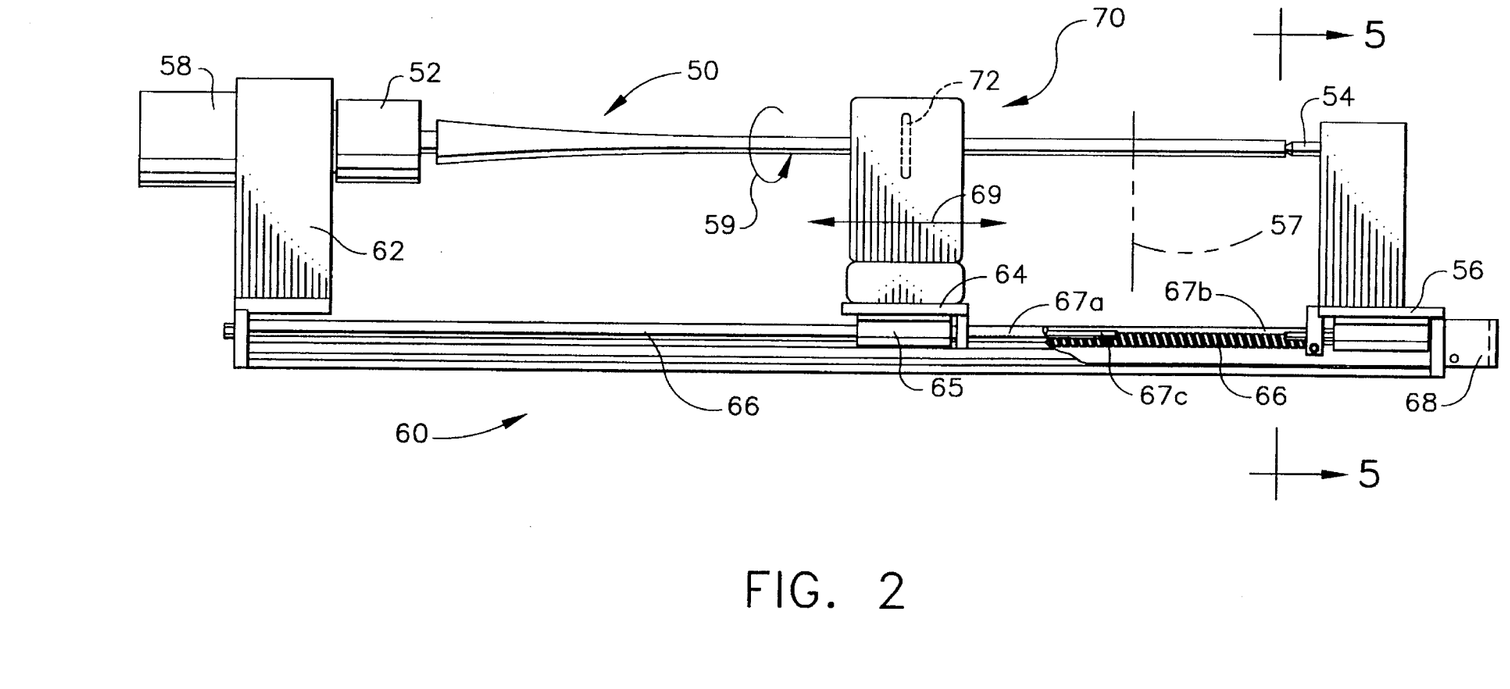
FIGS. 2 and 3 are top and side views showing a system in accordance with the present invention for precisely measuring a tapered cylindrical object such as a mandrel used in the pilgering process.
Figure 3:
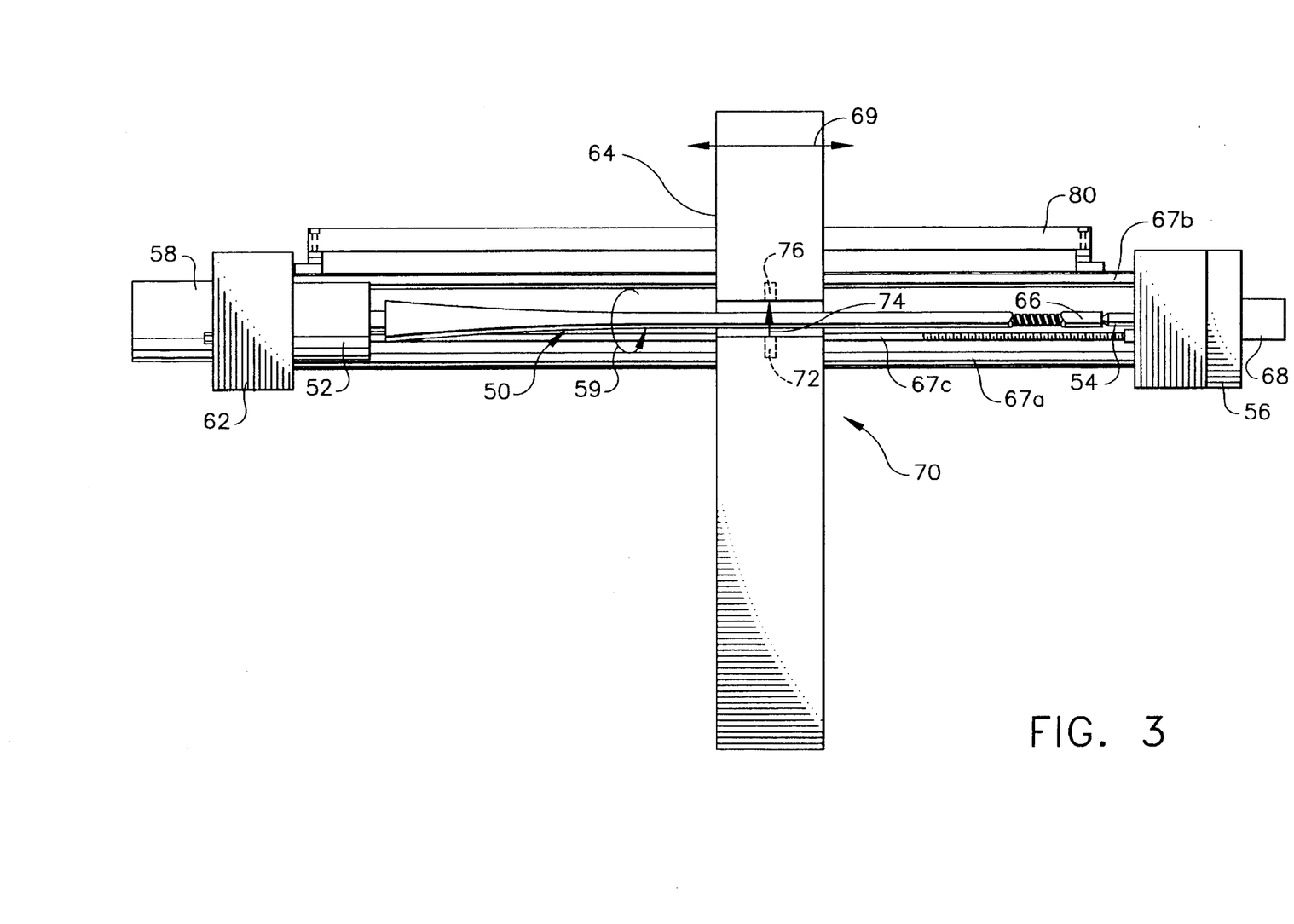

Referring to FIGS. 2 and 3, a system for precisely measuring a mandrel 50 includes a holder collet 52 rotatably mounted on a fixed member 62 and a holder spindle 54 mounted to an adjustable, lockable end member 56 at an opposite end from the collet 52. The fixed member 62 is securely mounted at one end of a linear positioning table assembly 60. The end member 56 is slidably mounted at the opposite end of linear positioning table assembly 60. The end position of end member 56 with spindle 54 may be adjusted to accommodate a range of mandrel lengths, as indicated by the dashed line 57 in FIG. 3.

A rotary stepper motor 58 has a rotary drive coupled to the collet 52 for moving the mandrel held between the collet 52 and the spindle 54 in stepwise fashion in an angular direction indicated by the arrow 59.

The linear positioning table assembly 60 also incorporates a slide member 64. The slide member 64 is moved linearly in an axial direction (indicated by the arrow 69) relative to the mandrel 50. The slide member 64 is driven by a screw rod 66 coupled to the rotary drive output of another rotary stepper motor 68.

For the specific application of pilgering nuclear fuel rod tubing, the linear positioning table assembly may be selected to accommodate a range of mandrel length, for example, up to 45 inches. A suitable linear positioning table assembly is the M1-90000 Series sold by LinTech Positioning Systems of Monrovia, Calif. Overtravel limit switches (not shown) are set at the ends of the mandrel length to limit the travel of the laser micrometer 70 along the mandrel 50.

Figure 4:
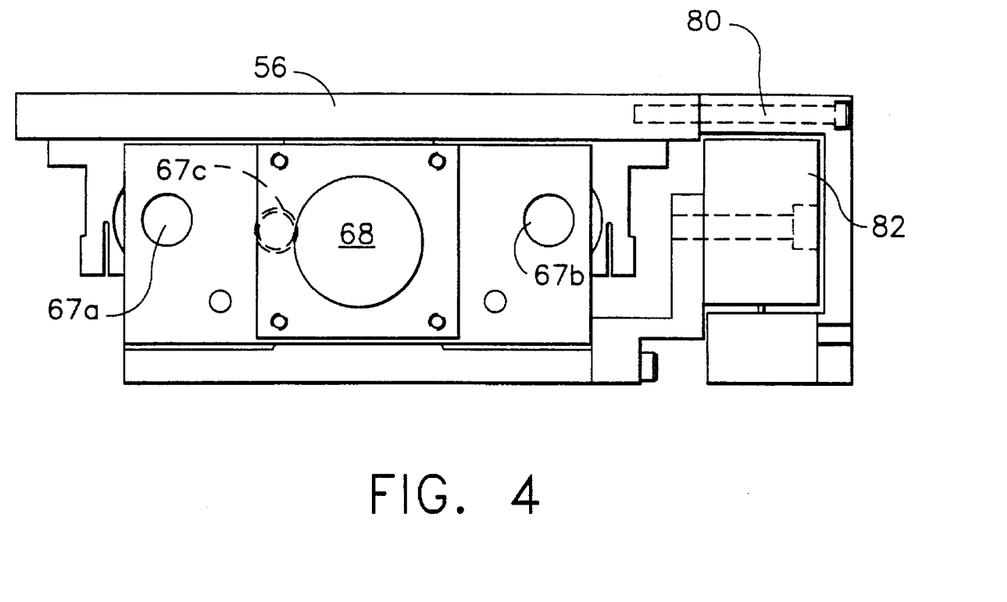
FIG. 4 is an end view of a linear positioning table used in the mandrel measuring system of FIG. 2.
Figure 5:
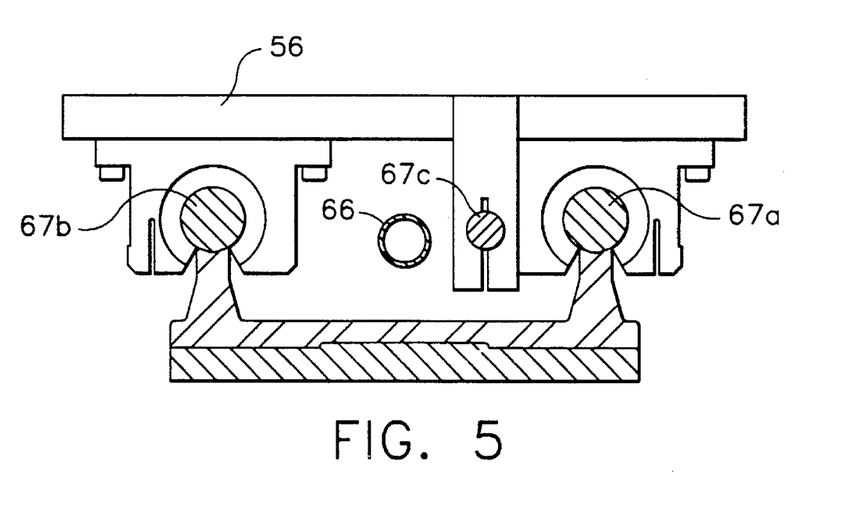
FIG. 5 is a sectional view of the linear positioning table taken along section 5—5 in FIG. 2.

The linear positioning table assembly in accordance with the preferred embodiment of the invention is illustrated in greater detail in FIGS. 4 and 5. The slide member 64 rides on twin rails 67a, 67b through ball bushings along the travel length as established by the setting of the overtravel limit switches. A guide rod 67c is provided in parallel with and in proximity to the screw rod 66. Screw rod 66 threads in a threaded member carried on an underside of the slide member 64. The exact linear position of the slide member 64 is measured by a scanner head 82 relative to a gauge plate 80 of a linear encoder unit. A suitable linear encoder unit is model DRC LX 1B-0042-BA-L10 sold by Motionex, Inc., of Raleigh, N.C. The gauge plate 80 is mounted on a fixed machine surface parallel to the travel axis and has optically readable markings thereon which are read by scanner head 82 mounted on slide member 64.

A laser micrometer instrument 70 is securely mounted on the slide member 64 of linear positioning table assembly 60. When the slide member 64 is moved linearly in an axial direction (indicated by the arrow 69) relative to the mandrel 50, laser measurements of the outer diameter can be taken at a multitude of axial positions arranged at intervals along the length of the mandrel.

Figure 6:
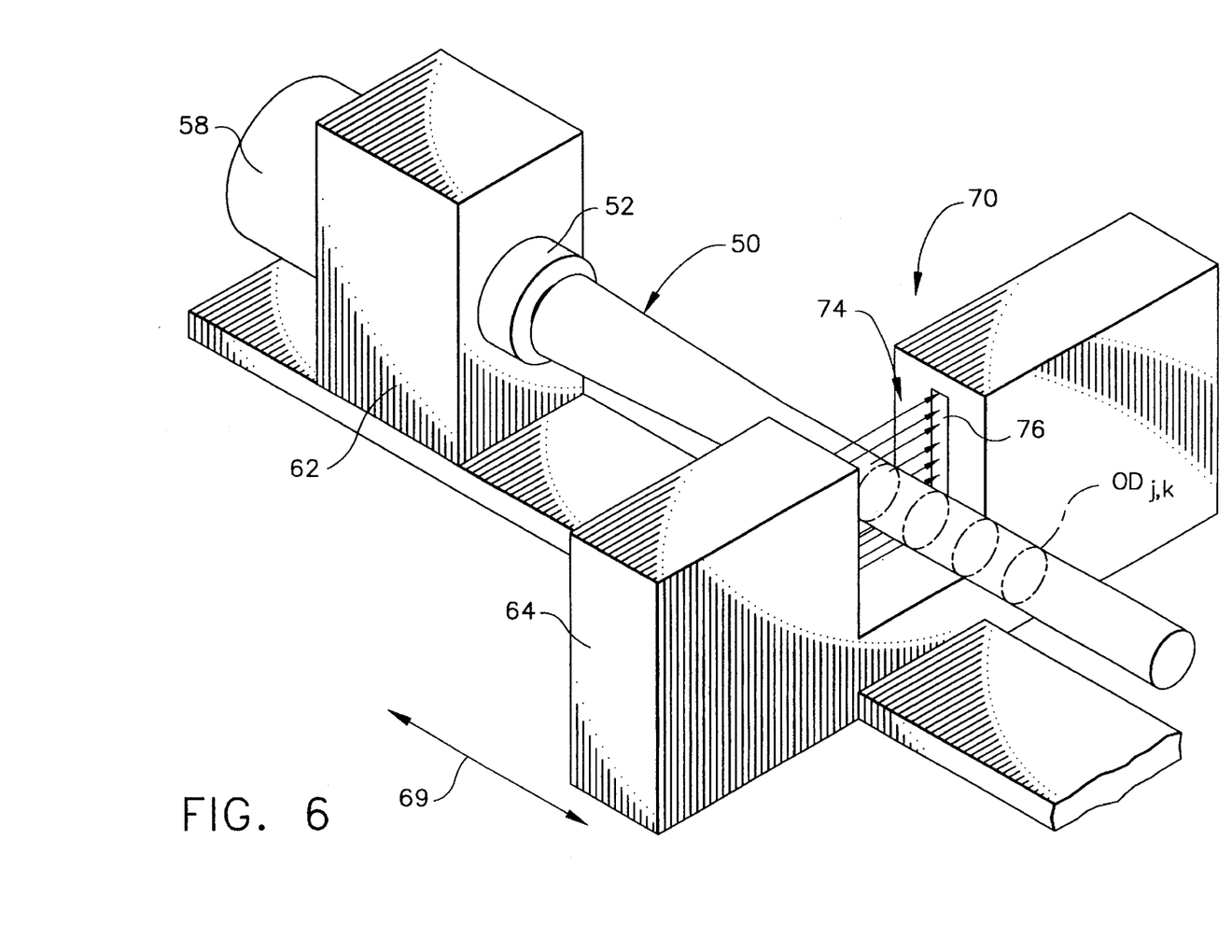
FIG. 6 is a diagrammatic perspective view illustrating use of the system in accordance with the invention to measure a mandrel.

As shown in FIGS. 2 and 6, the laser micrometer 70 is preferably of the type having a laser scanning head 72 which emits a sequence of laser beams in a vertical curtain 74 which scans across the vertical cross-sectional diameter of the mandrel at a constant scanning speed. A photoreceptor unit 76 is disposed opposite to the scanning head 72, the scanning head and photoreceptor unit being separated by a scanning gap.

As the beam traverses the diameter of the mandrel over a predetermined scanning interval, a timer circuit coupled to the photoreceptor unit 76 measures the precise time at which the laser beam is first blocked by the bottommost edge of the mandrel and the precise time at which the laser beam is detected upon being no longer blocked by the topmost edge of the mandrel. The interval between these two instants of time represents the time required for the scanning beam to traverse a distance equal to the outer diameter of the mandrel at the particular axial position of the scanning beam. Thus, the measurement of the beginning and end times effectively takes a "snapshot" of the silhouette of the mandrel at a particular angular position of the mandrel and at a particular axial position along its length. The mandrel outer diameter can be calculated by multiplying the measured time interval by the speed of scanning. A number (N) of measurements may be taken and averaged for greater reliability. A suitable laser micrometer system for performing such measurements includes a model LS3060 scan head and a model LS3100 control module sold by Keyence Corp., of Fairlawn, N.J.

At each axial position of the laser micrometer, the mandrel is rotated in stepwise fashion. At each angular position of the mandrel, the laser micrometer measures the mandrel outer diameter. The result is a series of outer diameter measurements ($OD_{j,k}$) at predetermined angular increments ($\theta_j$) over the circumference of the mandrel. This data effectively represents the cross-sectional contour of the mandrel at that axial position. The contour measurements are then repeated for a series of axial positions ($X_k$) distributed at intervals along the length of the mandrel, thereby effectively representing the contour of the tapered cylindrical surface.

Figure 7:
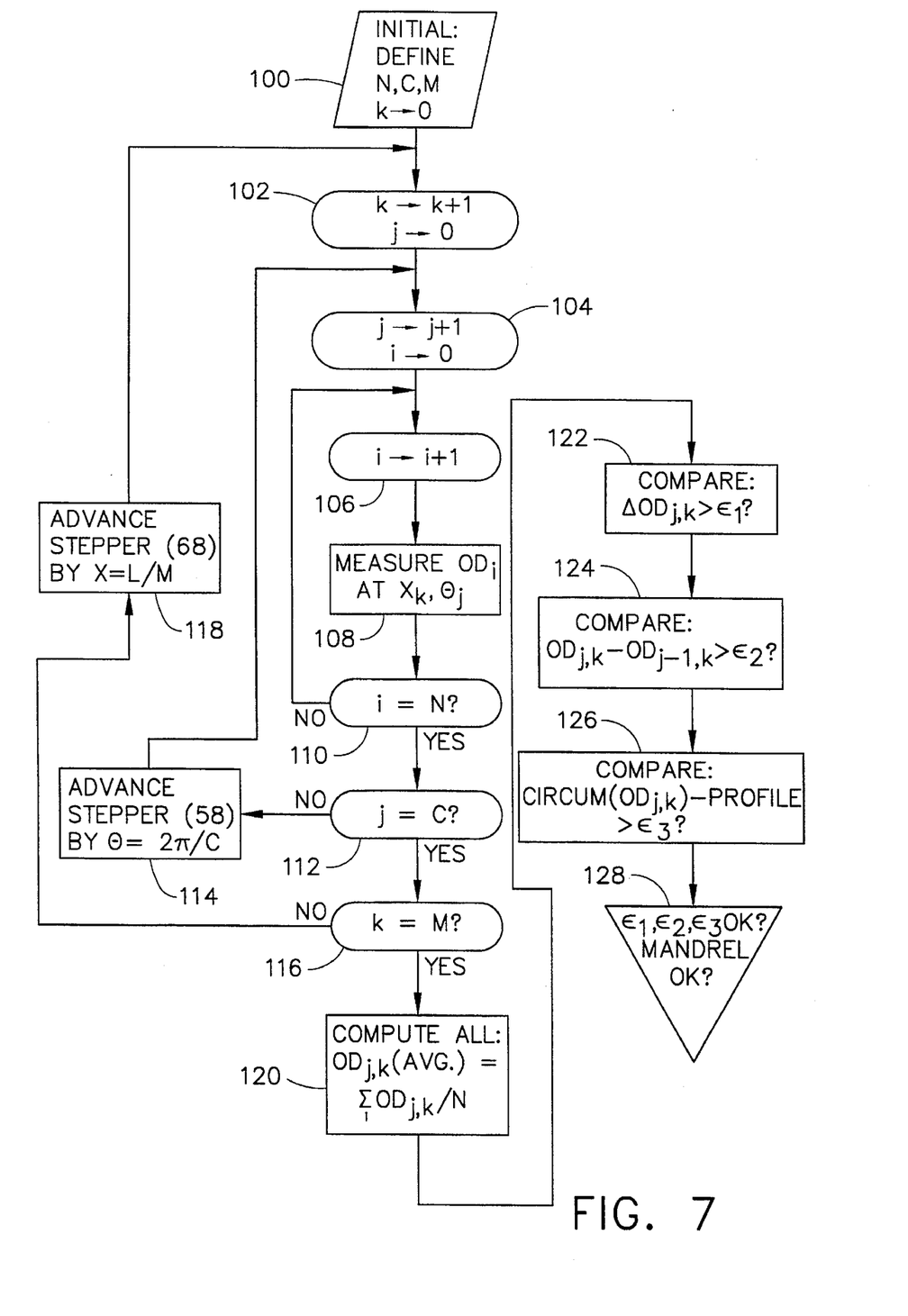
FIG. 7 is a block diagram of a computer logic sequence for control of the measuring system in accordance with the invention.

FIG. 7 illustrates a computer logic sequence for control of the measuring system in accordance with the preferred embodiment of the invention. The step sequences of the angular position stepper motor 58 and the axial position stepper motor 68 are controlled by computer so that the laser micrometer measurements are taken multiple times (N) at precise angular ($\theta_j$) and axial intervals ($X_k$). They are in effect "geared" together under program control. A selected number (C) of angular ($\theta_j$) intervals are circumferentially distributed at equal angular intervals about the circumference ($2\theta$) for the cross section at each respective axial position along the length of the mandrel. The number (M) of axial intervals ($X_k$) are spaced at intervals along the length L of the mandrel to be measured. The number of measurements N and intervals C, M are selected depending upon the size of the mandrel being measured and the accuracy required. Each mandrel is assigned a serial number and the mandrel profile determined from the laser measurements is saved in computer memory.

Average outer diameter measurements ($OD_{j,k}$) are computed by averaging the N measurements taken at each position. The mandrel is then assessed by computer program functions for comparing selected traits of the measured mandrel for deviation within given error levels ($\epsilon_1, \epsilon_2, \epsilon_3$), such as for incremental change in outer diameter, ovality, and fitting to a reference mandrel profile. If the measured traits are found to be within specified ranges of tolerances, the mandrel can be designated as acceptable for use.

In step 100, the system is initialized by defining the number of measurements N, the number of angular intervals C and the number of axial intervals M and by setting k=0. In step 102, the value of k is incremented by unity and j is set equal to zero. In step 104, the value of j is incremented by unity and i is set equal to zero. In step 106, the value of i is incremented by unity. The outer diameter $OD_1$ at $X_1$ and $\theta_1$ is then measured in step 108. In step 110, if i≠N, then step 106 is repeated and i is incremented by unity. Then the outer diameter $OD_2$ at $X_1$ and $\theta_1$ is measured in step 108. Steps 106, 108 and 110 are repeated until N measurements have been taken for the position defined by $X_1$ and $\theta_1$. When i=N in step 110, then step 112 is performed. In step 112, if j≠C, then stepper 58 rotates the mandrel by an angular increment equal to $2\pi/C$ and step 104 is repeated, i.e., j is incremented by unity. Thereafter steps 106, 108 and 110 are repeated until measurements $OD_1$ to $OD_N$ have been obtained for the position defined by $X_1$ and $\theta_2$. When i=N, steps 110, 114 and 104 are repeated, i.e, the stepper 58 rotates the mandrel by another angular increment equal to $2\theta/C$ and j is incremented by unity. The foregoing steps are repeated until N OD measurements have been obtained for each angular position $\theta_1$ through $\theta_c$. When j=C in step 112, step 116 is performed, i.e., the number k indicating the axial interval is compared to the total number of intervals M. If k≠M, then stepper 68 moves the laser micrometer by an axial increment equal to L/M and step 102 is repeated, i.e., k is incremented by unity. Thereafter steps 104, 106, 108, 110, 112, 114 are repeated until measurements $OD_1$ to $OD_N$ have been obtained for each angular position at the axial position defined by $X_2$. When j=C, steps 116, 118 and 102 are repeated, i.e, the stepper 68 moves the laser micrometer by another axial increment equal to L/M and k is incremented by unity. The foregoing steps are repeated until N OD measurements have been obtained for each angular position $\theta_1$ through $\theta_C$ for each axial position $X_1$ through $X_M$. When k=M in step 116, then step 120 is performed. In step 120, the average OD is calculated for each of the plurality of angular positions at each of the plurality of axial positions along the mandrel. Each average OD is then compared (step 122) to a desired maximum incremental change in outer diameter $\epsilon_1$. In step 124, the difference between the average ODs at successive angular positions is compared to a second tolerance $\epsilon_2$. Finally, in step 126, the circumference of the mandrel as defined by the measured ODs is compared to a reference profile and the deviations are compared to a third tolerance $\epsilon_3$. In step 128, the mandrel is rejected if any of the three tolerances $\epsilon_1$, $\epsilon_2$ and $\epsilon_3$ are exceeded and accepted otherwise.

The measuring system of the present invention allows rapid, automatic, and complete measurement and evaluation of the surface profile of the object being measured. For the application to mandrels for forming nuclear fuel cladding, the invention makes it possible to obtain increased throughput and higher yields for Zircaloy tubing production. It also results in an increased likelihood that mandrels will run properly, and will require less operator adjustments when installed in the pilger mill. Therefore, less downtime will be incurred by having to change or reposition a mandrel. Also, tube quality problems arising from defective mandrels should be minimized due to the pre-measurement and precise analysis of the condition of the mandrels.

These and other variations and modifications of the disclosed preferred embodiment will be readily apparent to practitioners skilled in the art of electro-optical detection and measurement. All such variations and modifications are intended to be encompassed by the claims set forth hereinafter.

We claim:

1. A method of measuring a tapered cylindrical object, comprising the steps of:

arranging said object such that its length is aligned along an axial direction and its circumference is rotatable in an angular direction;

incrementally moving an optical scanning measuring device stepwise in the axial direction relative to said object, said optical scanning measuring device having a plurality of axial positions along the length of said object;

incrementally rotating said object stepwise in the angular direction, said object having a plurality of angular positions for each of said plurality of axial positions of said optical scanning measuring device; and measuring said object with said optical scanning measuring device by scanning across and measuring points defining a respective diameter of said object while said object is stationary at each of said plurality of angular positions of said object, a respective plurality of measurements corresponding to said plurality of angular positions being taken at each of said plurality of axial positions along the length of said object, whereby a contour profile is provided consisting of a plurality of circumference profiles of said object acquired at said plurality of axial positions.

2. The measurement method as defined in claim 1, wherein multiple measurement are taken at each position of said object to be measured and said multiple measurements are averaged.

3. The measurement method as defined in claim 1, wherein the measuring step includes using a laser micrometer for scanning a laser beam across a cross-sectional diameter of said object, and measuring a time interval from a first instant when said scanning beam is blocked by said object to a second instant, after said scanning beam has traversed said object, when said scanning beam is no longer blocked by said object.

4. The measurement method as defined in claim 1, wherein an angular position stepper motor is used for incrementally rotating said object and an axial position stepper motor is used for incrementally moving said optical scanning measuring device.

5. The measurement method as defined in claim 4, wherein respective step sequences for the angular position stepper motor and the axial position stepper motor are controlled together by a computer program so that the measurements are taken at precise angular and axial intervals.

6. The measurement method as defined in claim 1, wherein the measurements of the contour profile of said object are assessed by computer program functions for comparison of average outer diameter data to predetermined desired outer diameter data.

7. The measurement method as defined in claim 1, wherein the measurements of the contour profile of said object are assessed by computer program functions for comparison of incremental change in outer diameter data to predetermined outer diameter incremental change data.

8. The measurement method as defined in claim 1, wherein the measurements of the contour profile of said object are assessed by computer program functions for comparison of ovality data to predetermined desired ovality data.

9. The measurement method as defined in claim 1, wherein said object is a mandrel.

10. An apparatus for measuring a tapered cylindrical object having a length along a longitudinal axis, comprising:

means for rotatably supporting said object such that said longitudinal axis is aligned along an axial direction and its circumference is rotatable in an angular direction;

optical scanning means for emitting a sequence of parallel beams in a curtain which scans across said object at a constant scanning speed, said curtain intersecting a plane perpendicular to said longitudinal axis and extending from a point on one side of said object to a point on the other side of said object;

means for incrementally moving said optical scanning means stepwise in the axial direction relative to said object, said optical scanning means having a plurality of axial positions along the length of said object;

means for incrementally rotating said object stepwise in the angular direction, said object having a plurality of angular positions for each of said plurality of axial positions of said optical scanning means; and means for measuring a time interval corresponding to the time interval between a first instant when one beam of said sequence of parallel beams is emitted and a second instant when another beam of said sequence of parallel beams is emitted, said one beam being the first beam in said sequence to intersect said object and said another beam being the next beam emitted after the last beam in said sequence to intersect said object, said time interval being measured while said object is stationary, wherein said time interval is proportional to the diameter of said object, a respective plurality of measurements corresponding to said plurality of angular positions being taken at each of said plurality of axial positions along the length of said object, whereby a contour profile is provided consisting of a plurality of circumference profiles of said object acquired at said plurality of axial positions.

11. The measuring apparatus as defined in claim 10, wherein multiple measurements are taken at each position of said object to be measured, further comprising means for averaging said multiple measurements.

12. The measuring apparatus as defined in claim 10, wherein said optical scanning means comprises a laser micrometer for scanning a laser beam across a cross-sectional diameter of said object.

13. The measuring apparatus as defined in claim 10, wherein said means for incrementally rotating said object stepwise in the angular direction comprises an angular position stepper motor and said means for incrementally moving said optical scanning means stepwise in the axial direction relative to said object comprises an axial position stepper motor.

14. The measuring apparatus as defined in claim 13, wherein respective step sequences for said angular position stepper motor and said axial position stepper motor are controlled together by a computer program so that the measurements are taken at precise angular and axial intervals.

15. The measuring apparatus as defined in claim 10, wherein said object is a mandrel.

16. An apparatus for measuring a tapered cylindrical object, comprising:

an optical scanning measuring device for scanning across and measuring points defining a cross sectional diameter of said object while said object is stationary;

linear positioning means for holding said object with its length axis aligned along an axial direction and its circumference rotatable in an angular direction, said linear positioning means including an axial position stepper motor for incrementally moving said optical scanning measuring device stepwise in the axial direction relative to said object for a plurality of axial positions along a length of said object;

angular position rotating means including an angular position stepper motor for incrementally rotating said object stepwise in the angular direction relative to said optical scanning measuring device for a plurality of angular positions over a circumference of said object; and means for controlling said linear positioning means, said angular position rotating means, and said optical scanning measuring device such that a series of diameter measurements are taken for a plurality of angular positions in order to provide a circumference profile of said object at each given axial position, and a series of measurements of circumference profiles are taken for a plurality of axial positions over the length of said object in order to provide a contour profile of said object.

17. The measuring apparatus as defined in claim 16, wherein said linear positioning means has a pair of end members for holding said object aligned in the axial direction and a slide member movable in the axial direction on which said optical scanning measuring device is mounted, and said axial position stepper motor moves said slide member and said optical scanning measuring device incrementally along the length of said object.

18. The measuring apparatus as defined in claim 17, wherein said angular position rotating means includes a collet as one of said end members and a spindle as the other of said end members, said angular position stepper motor is coupled to said collet for rotating said object, and said collet is maintained at a fixed linear position while said spindle is mounted on an adjustable, lockable slide for accommodating varying lengths of objects therebetween.

19. The measuring apparatus as defined in claim 16, wherein said optical scanning measuring device is a laser micrometer having a laser beam scanner arranged on one lateral side of said object for scanning a laser beam across a cross-sectional diameter of said object, a photoreceptor arranged on an opposite lateral side of said object for detecting the laser beam scanned across the diameter of said object, and a measuring circuit for measuring a time interval between a time point at which said object blocks said laser beam to a time point when said object no longer blocks said laser beam after traversing said object.

20. The measurement measuring apparatus as defined in claim 16, further comprising a linear encoder unit having a gauge plate with optically readable markings thereon fixedly mounted in the axial direction, and a scanner head mounted on said slide member for optically reading the markings of said gauge plate.

\* \* \* \* \*